United States Patent
Hu et al.

(10) Patent No.: US 12,529,503 B2
(45) Date of Patent: Jan. 20, 2026

(54) ROTATION SPEED CONTROL METHOD AND SYSTEM, DEVICE, AND STORAGE MEDIUM

(71) Applicants: ZHEJIANG GEELY HOLDING GROUP CO., LTD, Hangzhou (CN); ZHEJIANG LIANKONG TECHNOLOGIES CO., LTD, Ningbo (CN)

(72) Inventors: Lei Hu, Hangzhou (CN); Songyong Xia, Hangzhou (CN); Yehong Lu, Hangzhou (CN); Changlong Li, Hangzhou (CN); Yibo Qiang, Hangzhou (CN); Yongfeng Li, Hangzhou (CN)

(73) Assignees: ZHEJIANG GEELY HOLDING GROUP CO., LTD., Hangzhou (CN); ZHEJIANG LIANKONG TECHNOLOGIES CO., LTD., Ningbo (CN)

( * ) Notice: Subject to any disclaimer, the term of this patent is extended or adjusted under 35 U.S.C. 154(b) by 135 days.

(21) Appl. No.: 18/585,012

(22) Filed: Feb. 22, 2024

(65) Prior Publication Data
US 2024/0191925 A1 Jun. 13, 2024

Related U.S. Application Data

(63) Continuation of application No. PCT/CN2022/099796, filed on Jun. 20, 2022.

(30) Foreign Application Priority Data

Sep. 30, 2021 (CN) .......................... 202111164977.3

(51) Int. Cl.
F25B 49/02 (2006.01)
F25B 30/02 (2006.01)

(52) U.S. Cl.
CPC ............ F25B 49/022 (2013.01); F25B 30/02 (2013.01); F25B 2500/18 (2013.01);
(Continued)

(58) Field of Classification Search
CPC ........ F25B 30/02; F25B 49/02; F25B 49/022; F25B 2500/16; F25B 2500/18; F25B 2700/193; F25B 2700/21151
See application file for complete search history.

(56) References Cited

U.S. PATENT DOCUMENTS

2008/0134701 A1* 6/2008 Christensen .......... F25B 31/002
417/42

FOREIGN PATENT DOCUMENTS

CN 207470442 U 6/2018
CN 110726272 A 1/2020
(Continued)

*Primary Examiner* — Jonathan Bradford

(57) ABSTRACT

A rotation speed control method and system, a device, and a storage medium is provided, which is applied to a heat pump system. The heat pump system includes a throttling short tube and a compressor, both sides of the throttling short tube are provided with a temperature sensor and a pressure sensor. The rotation speed control method includes: collecting actual data of the temperature sensors and the pressure sensors, processing to obtain temperature ratio data and pressure ratio data, and obtaining a corresponding oil content prediction model through matching; obtaining predicted oil content data according to the temperature ratio data and the pressure ratio data; and controlling a rotation speed of the compressor according to the predicted oil content data.

10 Claims, 2 Drawing Sheets

(52) U.S. Cl.
CPC ... *F25B 2600/025* (2013.01); *F25B 2700/193* (2013.01); *F25B 2700/21151* (2013.01)

(56) References Cited

FOREIGN PATENT DOCUMENTS

| | | | |
|---|---|---|---|
| CN | 113803919 | A | 12/2021 |
| JP | H0634211 | A | 2/1994 |
| JP | 2013204821 | A | 10/2013 |

\* cited by examiner

ROTATION SPEED CONTROL METHOD AND SYSTEM, DEVICE, AND STORAGE MEDIUM

CROSS REFERENCE TO RELATED APPLICATION

The present application is a continuation application of PCT Application No. PCT/CN2022/099796, filed on Jun. 20, 2022, which claims the benefit of priority to a Chinese Patent Application number CN202111164977.3, filed on Sep. 30, 2021, the invention of the above application is hereby incorporated by reference in its entirety for all purposes.

TECHNICAL FIELD

The present invention relates to the field of heat pump system control technologies, and in particular, to a rotation speed control method and system, a device, and a storage medium.

BACKGROUND

With the promotion of electric vehicles, people have an increasingly high requirement on air conditioning systems of the electric vehicles. Nowadays, heat pump systems are often used in common air conditioning systems of electric vehicles. In a low-temperature heat pump heating mode of the heat pump system, viscosity of a refrigerant on a low-pressure side is usually increased because of a relatively low ambient temperature, and therefore, engine oil of a compressor in the heat pump system dissolves in the refrigerant, which makes oil return of the compressor difficult, and may even result in oil shortage or damage of the compressor. A flow speed of the refrigerant in the heat pump system is a major factor that changes oil content of the compressor. In the conventional technology, staff usually visually inspect actual oil content of the compressor to further make a judgement on compressor speed control. In the manner of adjusting the oil content of the compressor by manually controlling a rotation speed of the compressor, a lot of manpower and material resources are consumed, and specific control over the rotation speed of the compressor can be derived based on only experience of the staff, and may be inaccurate. Currently, there is no mature method for implementing automatic control over the rotation speed of the compressor.

In conclusion, there is a technical problem in the conventional technology that the rotation speed of the compressor cannot be automatically controlled.

SUMMARY

In view of the foregoing disadvantages of the conventional technology, the present invention is intended to provide a rotation speed control method, a system, a device, and a storage medium, to solve a technical problem in the conventional technology that automatic control over a rotation speed of a compressor cannot be performed.

To achieve the foregoing and other related objectives, the present invention provides a rotation speed control method, applied to a heat pump system. The heat pump system includes an electronic flow regulating valve and a compressor, both sides of the electronic flow regulating valve are provided with a temperature sensor and a pressure sensor, and the rotation speed control method includes:

collecting actual data of the temperature sensors and the pressure sensors, and processing to obtain temperature ratio data and pressure ratio data;

separately matching the temperature ratio data and the pressure ratio data with preset conditions of each pre-trained oil content prediction model, and if the matching succeeds, inputting the temperature ratio data and the pressure ratio data into an oil content prediction model obtained through the matching, and obtain predicted oil content data; and controlling the rotation speed of the compressor according to the predicted oil content data.

In an embodiment of the present invention, the step of collecting the actual data of the temperature sensors and the pressure sensors, and processing to obtain the temperature ratio data and the pressure ratio data includes:

collecting the actual data of the temperature sensors and the pressure sensors; and in the flow direction of a refrigerant in the heat pump system, dividing the actual data of the temperature sensor on the front side of the electronic flow regulating valve by the actual data of the temperature sensor on the back side thereof, to obtain the temperature ratio data; and dividing the actual data of the pressure sensor on the front side of the electronic flow regulating valve by the actual data of the pressure sensor on the back side thereof, to obtain the pressure ratio data.

In an embodiment of the present invention, the step of separately matching the temperature ratio data and the pressure ratio data with the preset conditions of each pre-trained oil content prediction model, and if the matching succeeds, inputting the temperature ratio data and the pressure ratio data into the oil content prediction model obtained through matching, to obtain the predicted oil content data includes:

determining whether the pressure ratio data accord with a preset pressure ratio range;

when the pressure ratio data accord with the pressure ratio range, further determining whether the temperature ratio range accords with a preset first temperature ratio range; and if yes, obtaining the corresponding first oil content prediction model through matching; or if no, obtaining the corresponding second oil content prediction model through matching; or when the pressure ratio data do not accord with the pressure ratio range, further determining whether the temperature ratio range accords with a preset second temperature ratio range; and if yes, obtaining the corresponding third oil content prediction model through matching; or if no, obtaining the corresponding fourth oil content prediction model through matching; and inputting the temperature ratio data and the pressure ratio data into the oil content prediction model obtained through matching, to obtain the predicted oil content data.

In an embodiment of the present invention, the step of obtaining the corresponding oil content prediction model through matching according to the temperature ratio data and the pressure ratio data further includes:

collecting actual data of the temperature sensors and the pressure sensors at a plurality of previous moments and actual oil content data of the compressor, and processing them to obtain a plurality of groups of the temperature ratio data and the pressure ratio data as sample data;

classifying the sample data according to the pressure ratio range, the first temperature ratio range, and the second temperature ratio range, to obtain four types of the sample data; and for each type of the sample data obtained after the classification, randomly dividing the type of the sample data into a training set and a test set;

training a neural network model according to the training set, and obtaining a trained neural network model; and inputting the test set into the trained neural network model to obtain the corresponding predicted oil content data; and when a probability that the predicted oil content data conforms to the actual oil content data reaches a preset threshold, determining the trained neural network model as the final oil content prediction model.

In an embodiment of the present invention, the temperature ratio data and the pressure ratio data at a same moment constitute one piece of the sample data.

In an embodiment of the present invention, the four types of the sample data include:

first-type sample data that accord with the pressure ratio range and the first temperature ratio range;

second-type sample data that accord with the pressure ratio range but do not accord with the first temperature ratio range;

third-type sample data that do not accord with the pressure ratio range and accord with the second temperature ratio range; and fourth-type sample data that do not accord with both the pressure ratio range and the second temperature ratio range.

In an embodiment of the present invention, the step of controlling the rotation speed of the compressor according to the predicted oil content data includes:

determining whether the predicted oil content data accord with a preset oil content range; and if yes, increasing the rotation speed of the compressor according to a preset value; or if no, controlling the rotation speed thereof to remain unchanged.

In the embodiments, a rotation speed control system is further disclosed, which is applied to a heat pump system. The system includes an electronic flow regulating valve and a compressor, both sides of the electronic flow regulating valve are provided with a temperature sensor and a pressure sensor, and the rotation speed control system includes:

a ratio data collection module, configured to collect actual data of the temperature sensors and the pressure sensors, process and obtain corresponding temperature ratio data and pressure ratio data;

an oil content prediction model obtaining module, configured to obtain a corresponding oil content prediction model through matching according to the temperature ratio data and the pressure ratio data;

a predicted oil content data obtaining module, configured to input the temperature ratio data and the pressure ratio data into the oil content prediction model obtained through matching, and obtain predicted oil content data; and a rotation speed control module, configured to control a rotation speed of the compressor according to the predicted oil content data.

In the embodiments, a computer device is further disclosed. The computer device includes a processor, the processor is coupled to a memory, and the memory stores program instructions, and when the program instructions stored in the memory are executed by the processor, the foregoing rotation speed control method is implemented.

In the embodiments, a computer-readable storage medium is further disclosed. The computer-readable storage medium includes a program, and when the program runs on a computer, the computer is enabled to perform the foregoing rotation speed control method.

In conclusion, the present invention provides the rotation speed control method and system, the device, and the storage medium, obtains four oil content prediction models through training by using a large amount of data, so that the heat pump system can predict the oil content of the compressor according to the readings of the temperature sensors and the pressure sensors, and further automatically control the rotation speed of the compressor according to the predicted oil content of the compressor, thereby implementing the automatic control over the compressor, preventing the oil shortage of the compressor, and improving the safety of the heat pump system.

BRIEF DESCRIPTION OF DRAWINGS

To describe the technical solutions in the embodiments of the present invention or in the conventional technology more clearly, the following briefly describes the accompanying drawings required for describing the embodiments or the conventional technology. Clearly, the accompanying drawings in the following description merely show some embodiments of the present invention, and a person of ordinary skill in the art can still derive other drawings from these accompanying drawings without creative efforts.

DESCRIPTION OF REFERENCE NUMERALS OF ELEMENTS

Figure 1:
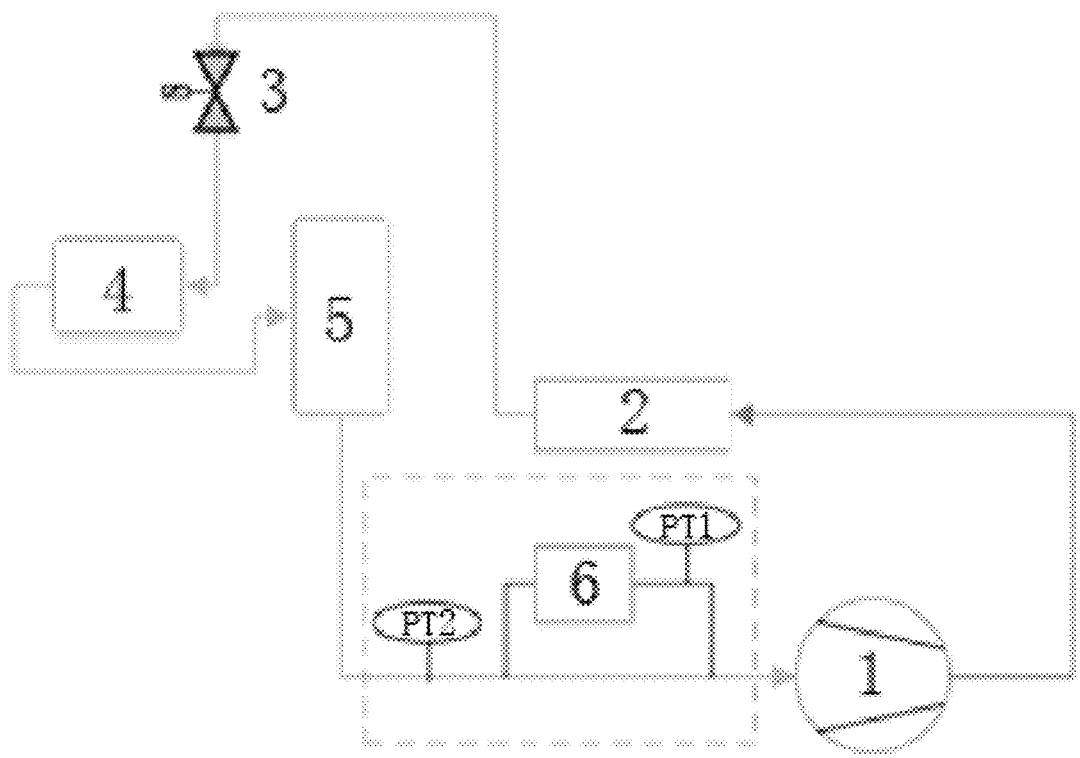
FIG. 1 is a schematic diagram of a structure of a heat pump system according to an embodiment of the present invention.
Figure 2:
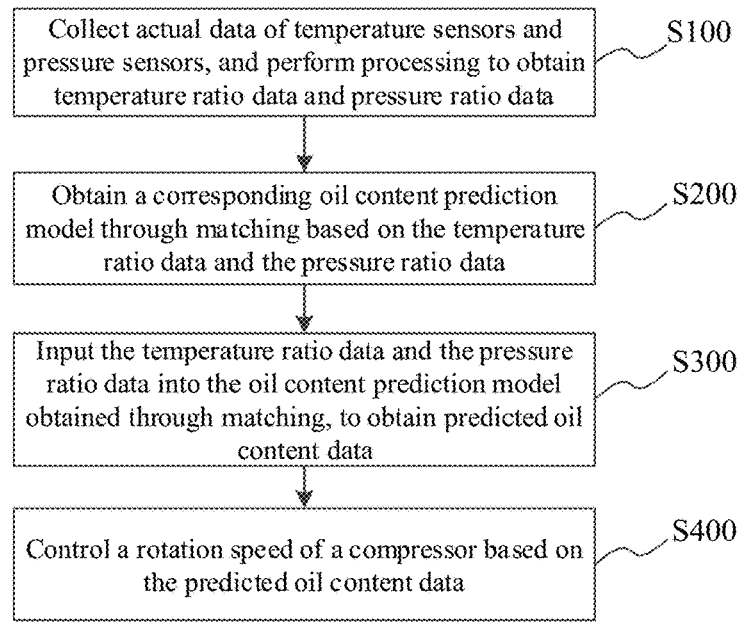
FIG. 2 is a schematic flowchart of a rotation speed control method according to an embodiment of the present invention.

1. compressor; 2. condenser; 3. electronic expansion valve; 4. evaporator; 5. gas-liquid separator; 6. electronic flow regulating valve; 100. rotation speed control system; 110. ratio data collection module; 120. oil content prediction model obtaining module; 130. predicted oil content data obtaining module; 200. computer device; 210. processor; and 220. memory.

DESCRIPTION OF EMBODIMENTS

The following describes implementations of the present invention by using specific examples. A person skilled in the art may easily understand other advantages and effects of the present invention based on content disclosed in this specification. The present invention may be further implemented or applied in other different specific implementations. Various details in this specification may also be modified or altered based on different viewpoints and applications without departing from the spirit of the present invention. It should be noted that the following embodiments and features in the embodiments may be mutually combined when there are no conflicts. It should be further understood that terms used in the embodiments of the present invention are used to describe specific implementation solutions, and are not used to limit the protection scope of the present invention. In the following embodiments, test methods not marked with specific conditions are usually performed based on conventional conditions or based on conditions recommended by manufacturers.

References are made to FIG. 1 to FIG. 4. It should be noted that the structure, scale, size, and the like shown in the accompanying drawings of this specification are merely used to cooperate with the content disclosed in the specification for understanding and reading by a person skilled in the art, and are not restrictions for limiting implementation of the present invention, and therefore have no technically substantial significance. Any modification of the structure, change of a proportional relationship or adjustment of the size shall still fall within the scope that can be covered by the technical content disclosed in the present invention, provided that they do not affect the effects that can be generated by the present invention and the purpose that can be achieved by the present invention. In addition, terms such as "upper", "lower", "left", "right", "middle", and "one" that are referred in this specification are merely used for ease of description, and are not intended to limit the scope of implementation of the present invention. A change or an adjustment of a relative relationship thereof also falls within the scope of implementation of the present invention on the premise that the technical content is not substantially changed.

When a value range is provided in an embodiment, it should be understood that unless otherwise stated in the present invention, two endpoints in each value range and any value between the two endpoints each can be selected. Unless otherwise defined, all technical and scientific terms used in the present invention are consistent with mastery of the conventional technology by a person skilled in the art and the descriptions of the present invention, and the present invention may be further implemented by using any method, device, or material in the conventional technology that is similar or equivalent to a method, device, or material described in the embodiments of the present invention.

A heat pump is an efficient energy-saving apparatus that fully uses low-grade heat energy. Heat can be spontaneously transferred from a high-temperature object to a low-temperature object, but cannot be spontaneously transferred in an opposite direction. A working principle of the heat pump is a mechanical apparatus that forces, through reverse circulation, the heat to flow from the low-temperature object to the high-temperature object. The heat pump can obtain a relatively large supply of heat by consuming only a small amount of reverse circulation net work, so that the low-grade heat energy that is difficult to use can be effectively used to save energy.

Referring to FIG. 1, a heat pump system includes a compressor 1, a condenser 2, an electronic expansion valve 3, an evaporator 4, a gas-liquid separator 5, and an electronic flow regulating valve 6 that are sequentially disposed in a flow direction of a refrigerant. The electronic flow regulating valve 6 is disposed on a low-pressure gas return circuit side of the compressor 1. In this embodiment, a sensor combination PT2 is disposed at a front end of the electronic flow regulating valve 6, and a sensor combination PT1 is disposed at a back end of the electronic flow regulating valve 6.

The sensor combination PT1 and the sensor combination PT2 each include a temperature sensor and a pressure sensor. In another preferred embodiment, the electronic flow regulating valve 6 may be any one of a throttling short tube, an electronic expansion valve, or a thermal expansion valve.

FIG. 1 is a schematic flowchart of a rotation speed control method according to the embodiment. The rotation speed control method includes the following steps:

Step S100: Collect actual data of the sensor combination PT1 and the sensor combination PT2, and process them to obtain temperature ratio data and pressure ratio data.

Step S100 specifically includes:

collecting actual data of the temperature sensors and the pressure sensors in the sensor combination PT1 and the sensor combination PT2; and dividing the actual data of the temperature sensor of the sensor combination PT2 by the actual data of the temperature sensor of the sensor combination PT1, and thus obtaining the temperature ratio data T2/T1; and dividing the actual data of the pressure sensor of the sensor combination PT2 by the actual data of the pressure sensor of the sensor combination PT1, and obtaining the pressure ratio data P2/P1.

Step S200: Obtain a corresponding oil content prediction model through matching according to the temperature ratio data T2/T1 and the pressure ratio data P2/P1.

In step S200, it is first determined whether the pressure ratio data P2/P1 accord with a preset pressure ratio range (0, A); when the pressure ratio data P2/P1 accord with the pressure ratio range (0, A), it is further determined whether the temperature ratio range T2/T1 accord with a preset first temperature ratio range (0, B); and if yes, a first corresponding oil content prediction model is obtained through matching; or if no, a second corresponding oil content prediction model is obtained through matching.

When the pressure ratio data P2/P1 do not accord with the pressure ratio range (0, A), it is further determined whether the temperature ratio range T2/T1 accords with a preset second temperature ratio range (0, C); and if yes, a third corresponding oil content prediction model is obtained through matching; or if no, a fourth corresponding oil content prediction model is obtained through matching.

Specifically, the pressure ratio range (0, A), the first temperature ratio range (0, B), and the second temperature ratio range (0, C) are determined according to the actual situation. In a preferred embodiment, A may be 3, B may be 4, and C may be 3.

Further, step S200 further includes a training method for an oil content prediction model, including:

collecting the actual data of the temperature sensors and the pressure sensors in the sensor combination PT1 and the sensor combination PT2 at a plurality of previous moments and the actual oil content data of the compressor 1, and processing to obtain a plurality of groups of temperature ratio data and pressure ratio data as the sample data, where the temperature ratio data and the pressure ratio data at a same moment constitute one piece of the sample data; and classifying the sample data according to the pressure ratio range (0, A), the first temperature ratio range (0, B), and the second temperature ratio range (0, C), to obtain four types of the sample data. Specifically, the four types of the sample data include:

first-type sample data that accord with the pressure ratio range (0, A) and the first temperature ratio range (0, B);

second-type sample data that accord with the pressure ratio range (0, A) but do not accord with the first temperature ratio range (0, B);

third-type sample data that do not accord with the pressure ratio range (0, A) and accord with the second temperature ratio range (0, C); and fourth-type sample data that do not accord with both the pressure ratio range (0, A) and the second temperature ratio range (0, C).

For each type of the sample data obtained after the classification, the type of sample data are divided into a training set and a test set; a neural network model is trained according to the training set to obtain a trained neural network model; the test set are input into the trained neural network model to obtain corresponding predicted oil content data; and when a probability that the predicted oil content data conform to the actual oil content data reaches a preset threshold, the trained neural network model is determined as the final oil content prediction model.

In this embodiment, the neural network model as used may be a support vector regression model. It should be noted that the type of the neural network model is not limited in the present invention, it would be ok that the corresponding predicted oil content data may be obtained according to the input test set data.

In this embodiment, four oil content prediction models corresponding to the four types of the sample data are finally obtained.

After the actual temperature ratio data T2/T1 and the pressure ratio data P2/P1 are obtained through the processing in step S100, a sample data type to which the actual temperature ratio data T2/T1 and the pressure ratio data P2/P1 conform is determined according to the pressure ratio range (0, A), the first temperature ratio range (0, B), and the second temperature ratio range (0,C). A corresponding oil content prediction model is further obtained through matching. For example, when the actual temperature ratio data T2/T1 and the pressure ratio data P2/P1 do not accord with the pressure ratio range (0, A), but accord with the second temperature ratio range (0, C), the third oil content prediction model is obtained through matching.

Step S300: Input the temperature ratio data T2/T1 and the pressure ratio data P2/P1 into the oil content prediction model obtained through the matching, and obtain the predicted oil content data.

Step S400: Control the rotation speed of the compressor 1 according to the predicted oil content data.

Step S400 specifically includes:
determining whether the predicted oil content data accord with a preset oil content range (1, D); and
if yes, increasing the rotation speed of the compressor 1 according to a preset value; or if no, controlling the rotation speed thereof to remain unchanged.

Specifically, the oil content range (1, D) is determined according to the actual situation. In a preferred embodiment, D may be 7.

Figure 3:
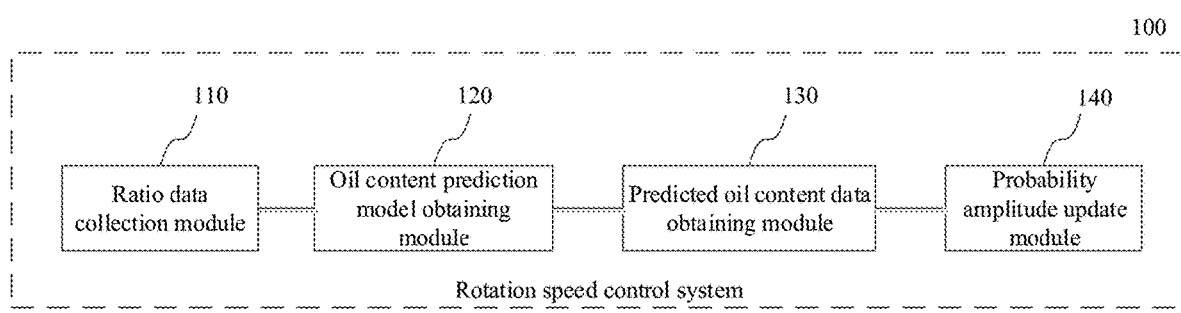
FIG. 3 is a schematic diagram of a structure of a rotation speed control system according to an embodiment of the present invention.

Referring to FIG. 3, in the embodiment may include a rotation speed control system 100, which is applied to the foregoing heat pump system. The rotation speed control system includes:
a ratio data collection module 110, configured to collect the actual data of the temperature sensors and the pressure sensors in the sensor combination PT1 and the sensor combination PT2, and process to obtain the temperature ratio data and the pressure ratio data;
an oil content prediction model obtaining module 120, configured to obtain the corresponding oil content prediction model through matching according to the temperature ratio data and the pressure ratio data;
a predicted oil content data obtaining module 130, configured to input the temperature ratio data and the pressure ratio data into the oil content prediction model obtained through matching, and obtain the predicted oil content data; and
a rotation speed control module 140, configured to control the rotation speed of the compressor according to the predicted oil content data.

Figure 4:
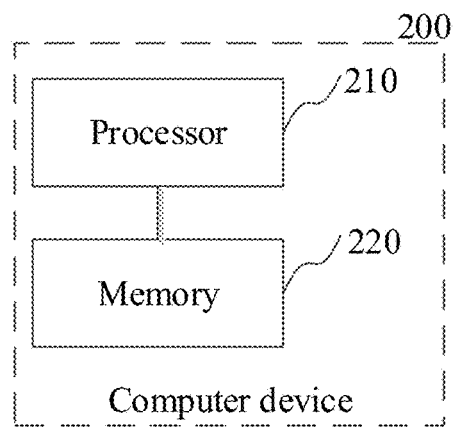
FIG. 4 is a schematic diagram of a structure of a computer device according to an embodiment of the present invention.

Referring to FIG. 4, in the embodiments, a computer device 200 is further included. The computer device 200 includes a processor 210, the processor 210 is coupled to a memory 220, the memory 220 stores program instructions, and when the program instructions stored in the memory 220 are executed by the processor 210, the foregoing rotation speed control method is implemented. The processor 210 may be a general-purpose processor, including a central processing unit (CPU), a network processor (NP), and the like, or may be a digital signal processor (DSP), an application specific integrated circuit (ASIC), a field-programmable gate array (FPGA) or another programmable logic device, a discrete gate or a transistor logic device, or a discrete hardware component. The memory 220 may include a random access memory (RAM), and may further include a non-volatile memory, for example, at least one disk memory. The memory 220 may alternatively be an internal memory of a random access memory (RAM) type. The processor 210 and the memory 220 may be integrated into one or more independent circuits or hardware, for example, an application specific integrated circuit (ASIC). It should be noted that a computer program in the memory 220 may be stored in a computer-readable storage medium when being implemented in a form of a software functional unit and sold or used as an independent product. Based on such an understanding, the technical solutions of the present invention essentially, or the part contributing to the conventional technology, or some of the technical solutions may be implemented in a form of a software product. The computer software product is stored in a storage medium, and includes several instructions for instructing a computer device (which may be a personal computer, an electronic device, a network device, or the like) to perform all or some of the steps of the methods in embodiments of the present invention.

In the embodiments, a computer-readable storage medium is further included. The computer-readable storage medium includes a program, and when the program runs on a computer, the computer is enabled to perform the foregoing rotation speed control method.

In conclusion, the rotation speed control method and system, the device, and the storage medium provided in the present invention obtain four oil content prediction models through training by using a large amount of data, so that the heat pump system can predict oil content of the compressor according to readings of the temperature sensors and the pressure sensors, and further automatically control the rotation speed of the compressor according to the predicted oil content of the compressor, thereby implementing the automatic control over the compressor, preventing the oil shortage of the compressor, and improving the safety of the heat pump system. Therefore, the present invention effectively overcomes various disadvantages in the conventional technology and has high industrial utilization value.

The foregoing embodiments merely illustrate principles and effects of the present invention, but are not intended to limit the present invention. Any person skilled in the art may modify or alter the foregoing embodiments without departing from the spirit and scope of the present invention. Therefore, all equivalent modifications or alterations completed by a person of ordinary skill in the art without departing from the spirit and technical ideas disclosed in the present invention shall still be covered by the claims of the present invention.

What is claimed is:

1. A rotation speed control method for a heat pump system, wherein the heat pump system comprises an electronic flow regulating valve and a compressor, both sides of the electronic flow regulating valve are provided with a temperature sensor and a pressure sensor, and the rotation speed control method comprises:
collecting actual data of the temperature sensors and the pressure sensors, and processing to obtain temperature ratio data and pressure ratio data;
providing pre-trained oil content prediction models, each of the pre-trained oil content prediction models having a preset temperature ratio range and a preset pressure ratio range that are different from those of remaining pre-trained oil content prediction models,
comparing the temperature ratio data with the preset temperature ratio range and comparing the pressure ratio data with the preset pressure ratio range to retrieve one of the pre-trained oil content prediction models that both the temperature ratio data and the pressure ratio data are within the preset temperature ratio range and the preset pressure ratio range of the one of the pre-trained oil content prediction models;
inputting the temperature ratio data and the pressure ratio data into the one of the pre-trained oil content prediction models to obtain predicted oil content data; and
controlling a rotation speed of the compressor according to the predicted oil content data.

2. The rotation speed control method according to claim 1, wherein the step of collecting the actual data of the temperature sensors and the pressure sensors, comprises:
collecting the actual data of the temperature sensors and the pressure sensors; and
in a flow direction of a refrigerant in the heat pump system, dividing the actual data of the temperature sensor on an upstream of the electronic flow regulating valve by the actual data of the temperature sensor on an downstream thereof, to obtain the temperature ratio data; and dividing the actual data of the pressure sensor on the upstream of the electronic flow regulating valve by the actual data of a pressure sensor on the downstream thereof, to obtain the pressure ratio data.

3. The rotation speed control method according to claim 1, wherein the step of providing pre-trained oil content prediction models, each of the pre-trained oil content prediction models having a preset temperature ratio range and a preset pressure ratio range that are different from those of remaining pre-trained oil content prediction models comprises:
providing first, second, third and fourth pre-trained oil content prediction models, wherein
the first pre-trained oil content prediction model has a first preset pressure ratio range and a first preset temperature ratio range,
the second pre-trained oil content prediction model has the first preset pressure ratio range and a temperature ratio range that is out of first preset temperature ratio range,
the third pre-trained oil content prediction model has a pressure ratio range that is out of the first preset pressure ratio range and a second preset temperature ratio range, and
the fourth pre-trained oil content prediction model has a pressure ratio range that is out of the first preset pressure ratio range and a temperature ratio range that is out of the second preset temperature ratio range,
determining whether the pressure ratio data is within the first preset pressure ratio range;
when the pressure ratio data is within the first preset pressure ratio range, further determining whether the temperature ratio data is within the first preset temperature ratio range; and if yes, retrieving the first pre-trained oil content prediction model so as to input the pressure ratio data and the temperature ratio data into the first pre-trained oil content prediction model to obtain the predicted oil content data, no, retrieving the second pre-trained oil content prediction model so as to input the pressure ratio data and the temperature ratio data into the second pre-trained oil content prediction model to obtain the predicted oil content data; and
when the pressure ratio data is not within the first preset pressure ratio range, further determining whether the temperature ratio data is within the second preset temperature ratio range; and if yes, retrieving the third pre-trained oil content prediction model, so as to input the pressure ratio data and the temperature ratio data into the third pre-trained oil content prediction model to obtain the predicted oil content data; if no, retrieving the fourth pre-trained oil content prediction model so as to input the pressure ratio data and the temperature ratio data into the fourth pre-trained oil content prediction model to obtain the predicted oil content data.

4. The rotation speed control method according to claim 3, wherein providing first, second, third and fourth pre-trained oil content prediction models further comprises:
collecting actual data of the temperature sensors and the pressure sensors at a plurality of previous moments and actual oil content data of the compressor, and processing to obtain a plurality of groups of temperature ratio data and pressure ratio data as sample data;
classifying the sample data according to the first preset pressure ratio range, the first preset temperature ratio range, and the second preset temperature ratio range, to obtain four types of the sample data; and
for each type of the sample data obtained after the classification,
randomly dividing the type of the sample data into a training set and a test set;
training a neural network model with the training set to obtain a trained neural network model;
inputting the test set into the trained neural network model to obtain corresponding predicted oil content data; and
when a probability that the obtained corresponding predicted oil content data conforms to the actual oil content data reaches a preset threshold, determining the trained neural network model as a final oil content prediction model; and
four final oil content prediction models being provided as the first, second, third and fourth pre-trained oil content prediction models correspondingly.

5. The rotation speed control method according to claim 4, wherein the temperature ratio data and the pressure ratio data at a same moment constitute one piece of the sample data.

6. The rotation speed control method according to claim 4, wherein the four types of sample data comprise:
first-type sample data that is within the first preset pressure ratio range and the first preset temperature ratio range;

second-type sample data that is within the first preset pressure ratio range and is not within the first preset temperature ratio range;

third-type sample data that is not accord with within the first preset pressure ratio range and is within the second preset temperature ratio range; and fourth-type sample data that is not within both the first preset pressure ratio range and the second preset temperature ratio range.

7. The rotation speed control method according to claim 1, wherein the step of controlling the rotation speed of the compressor according to the predicted oil content data comprises:

determining whether the predicted oil content data is within a preset oil content range; and if yes, increasing the rotation speed of the compressor according to a preset value; or if no, controlling the rotation speed thereof to remain unchanged.

8. A rotation speed control system for a heat pump system, wherein the system comprises an electronic flow regulating valve and a compressor, both sides-upstream and downstream of the electronic flow regulating valve are provided with a temperature sensor and a pressure sensor, and the rotation speed control system comprises:

a ratio data collection module, configured to collect actual data of the temperature sensors and the pressure sensors, and process to obtain temperature ratio data and pressure ratio data;

an oil content prediction model obtaining module, configured to provide pre-trained oil content prediction models, each of the pre-trained oil content prediction models having a preset temperature ratio range and a preset pressure ratio range that are different from those of remaining pre-trained oil content prediction models, and configured to compare the temperature ratio data with the preset temperature ratio range and compare the pressure ratio data with the preset pressure ratio range to retrieve one of the pre-trained oil content prediction models that both the temperature ratio data and the pressure ratio data are within the preset temperature ratio range and the preset pressure ratio range of the one of the pre-trained oil content prediction models;

a predicted oil content data obtaining module, configured to input the temperature ratio data and the pressure ratio data into the one of the pre-trained oil content prediction models to obtain predicted oil content data; and a rotation speed control module, configured to control a rotation speed of the compressor according to the predicted oil content data.

9. A computer device, comprising a processor, wherein the processor is coupled to a memory, the memory stores program instructions, and when the program instructions stored in the memory are executed by the processor, the rotation speed control method according to claim 1 is implemented.

10. A non-transitory computer-readable storage medium; having a program stored thereon, wherein when the program runs on a computer, the computer is enabled to perform the rotation speed control method according to claim 1.

* * * * *